(12) United States Patent
Pingitore, Jr.

(10) Patent No.: US 9,890,441 B2
(45) Date of Patent: Feb. 13, 2018

(54) EXTRACTION AND RECOVERY OF YTTRIUM AND RARE EARTH ELEMENTS

(71) Applicant: Board of Regents, The University of Texas System, Austin, TX (US)

(72) Inventor: Nicholas E. Pingitore, Jr., El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 272 days.

(21) Appl. No.: 14/941,434

(22) Filed: Nov. 13, 2015

(65) Prior Publication Data

US 2016/0138133 A1     May 19, 2016

Related U.S. Application Data

(60) Provisional application No. 62/079,298, filed on Nov. 13, 2014.

(51) Int. Cl.
| | |
|---|---|
| *C22B 59/00* | (2006.01) |
| *C22B 1/20* | (2006.01) |
| *C22B 3/06* | (2006.01) |
| *C22B 1/24* | (2006.01) |
| *C22B 3/08* | (2006.01) |
| *C22B 3/10* | (2006.01) |
| *C22B 1/00* | (2006.01) |

(52) U.S. Cl.
CPC ............. *C22B 59/00* (2013.01); *C22B 1/00* (2013.01); *C22B 1/24* (2013.01); *C22B 3/06* (2013.01); *C22B 3/08* (2013.01); *C22B 3/10* (2013.01); *Y02P 10/234* (2015.11)

(58) Field of Classification Search
CPC .... C22B 1/00; C22B 3/06; C22B 3/08; C22B 3/10; C22B 59/00
See application file for complete search history.

(56) References Cited

U.S. PATENT DOCUMENTS

2017/0175229 A1*   6/2017   Wyrsta .................... C22B 59/00

FOREIGN PATENT DOCUMENTS

CN          101012501 A   *   8/2007

OTHER PUBLICATIONS

McKelvey, V.E. "Geological Survey Research 1972." Geological Survey Research 1972, Paper 800-A, United States Government Printing Office, pp. C63 and C66. (Year: 1972).*
Krier, C A. "Phases and Processes: High-Temperature Metals." Journal of Metals, June. pp. 574-576. (Year: 1960).*
Xu Wenlin Wang. CN 101012501 A. Machine translation (Year: 2007).*

* cited by examiner

*Primary Examiner* — George Wyszomierski
*Assistant Examiner* — Tima M McGuthry Banks
(74) *Attorney, Agent, or Firm* — Norton Rose Fulbright US LLP

(57) ABSTRACT

Methods for extraction and recovery of rare earth elements are disclosed. In one aspect, heap leaching with a leach solution comprising sulfuric acid is used to extract rare earth elements including yttrium and light and heavy rare earth elements.

20 Claims, 4 Drawing Sheets

EXTRACTION AND RECOVERY OF YTTRIUM AND RARE EARTH ELEMENTS

CROSS-REFERENCE TO RELATED APPLICATIONS

This application claims the benefit of the filing date of U.S. Provisional Patent Application No. 62/079,298, filed on Nov. 13, 2014, by the inventor of this application, and incorporated herein by reference.

STATEMENT REGARDING FEDERALLY SPONSORED RESEARCH

Not applicable.

TECHNICAL FIELD OF THE INVENTION

The present disclosure relates generally to methods for the extraction and recovery of yttrium and rare earth elements. More specifically, the present disclosure relates to methods for the extraction and recovery of yttrium and light and heavy rare earth metals.

BACKGROUND

Rare earth elements (REEs) are essential components of current and emerging $21^{st}$ century technologies. Recent concern about future supplies of all the REEs now has narrowed chiefly to the heavy rare earth elements (HREEs). Essentially, all of the world's HREEs currently are sourced from the south China ion-adsorption clay deposits. The ability of those deposits to maintain and increase production is uncertain, particularly in light of environmental degradation associated with some mining and extraction operations in the region.

As such, identification and development of processes for improved extraction and recovery of REEs is desired in order to exploit deposits in other parts of the world.

SUMMARY

In view of the aforementioned problems and trends, embodiments of the present disclosure provide methods for extraction and recovery of yttrium and rare earth elements (Y+REE).

In one aspect, a method for recovering yttrium and light and heavy rare earth elements (Y+LREEs+HREEs) by a heap leaching process is disclosed. The method includes processing ore containing deposits of yttrium and light rare earth elements (Y+LREEs) and deposits of yttrium and heavy rare earth elements (Y+HREEs), wherein the ore contains yttrofluorite. The method further includes irrigating the ore on a leach pad with a mineral acid leach solution. The method also includes dissolving the yttrofluorite in the ore in the mineral acid leach solution and treating the yttrium and heavy and light rare earth elements in the mineral acid leach solution to recover the yttrium and heavy and light rare earth elements from the ore.

In some aspects, the method further includes treating the light rare earth elements in the mineral acid leach solution to recover the light rare earth elements from the ore. In some aspects, the processing step includes crushing the ore into a grain size of approximately 2 mm to approximately 20 mm. In some other aspects, the processing step includes crushing the ore into a grain size of approximately 12.5 mm. In some aspects, the mineral acid leach solution comprises sulfuric acid. In some other aspects, the mineral acid leach solution comprises hydrochloric acid. In some aspects, the mineral acid leach solution comprises from approximately 5.0% V/V (volume/volume percent) sulfuric acid to approximately 10.0% V/V sulfuric acid. In some other aspects, the mineral acid leach solution comprises 8.3% V/V sulfuric acid. In some aspects, a time period for the irrigating step is up to approximately three months. In some aspects, the irrigating step is conducted at ambient temperature.

According to a second aspect, a method for heap leaching yttrium and light and heavy rare earth elements is disclosed. The method includes crushing ore from a rock formation containing yttrofluorite or other acid soluble yttrium and rare earth element (Y+REE) containing minerals, wherein the ore contains a deposit of light rare earth elements (LREEs) and a deposit of heavy rare earth elements (HREEs), wherein yttrofluorite hosts at least some of the yttrium and heavy rare earth elements (Y+HREEs). The method further includes heaping the ore on a leach pad. The method further includes allowing a mineral acid leach solution to permeate the ore to dissolve the fluorite in the rock formation. The method also includes separating the yttrium and heavy rare earth elements in the mineral acid leach solution to recover the yttrium and heavy rare earth elements from the ore.

In some aspects, the method further includes separating the light rare earth elements in the mineral acid leach solution to recover the light rare earth elements from the ore. In some aspects, the crushing step comprises crushing the ore into a grain size of approximately 2 mm to 20 mm. In some other aspects, the crushing step comprises crushing the ore into a grain size of approximately 12.5 mm. In some aspects, the mineral acid leach solution comprises sulfuric acid. In some other aspects, the mineral acid leach solution comprises hydrochloric acid. In some aspects, the mineral acid leach solution comprises from approximately 5.0% V/V (volume/volume percent) sulfuric acid to approximately 10.0% V/V sulfuric acid. In some other aspects, the mineral acid leach solution comprises 8.3% V/V sulfuric acid. In some aspects, the allowing step is conducted for up to approximately three months. In some aspects, the mineral acid leach solution permeates the ore at approximately room temperature.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter can be better understood by reference to one or more of these drawings in combination with the description of embodiments presented herein. Consequently, a more complete understanding of the present embodiments and further features and advantages thereof can be acquired by referring to the following description taken in conjunction with the accompanying drawings, in which like reference numerals identify like elements, wherein:

DETAILED DESCRIPTION

Figure 1:
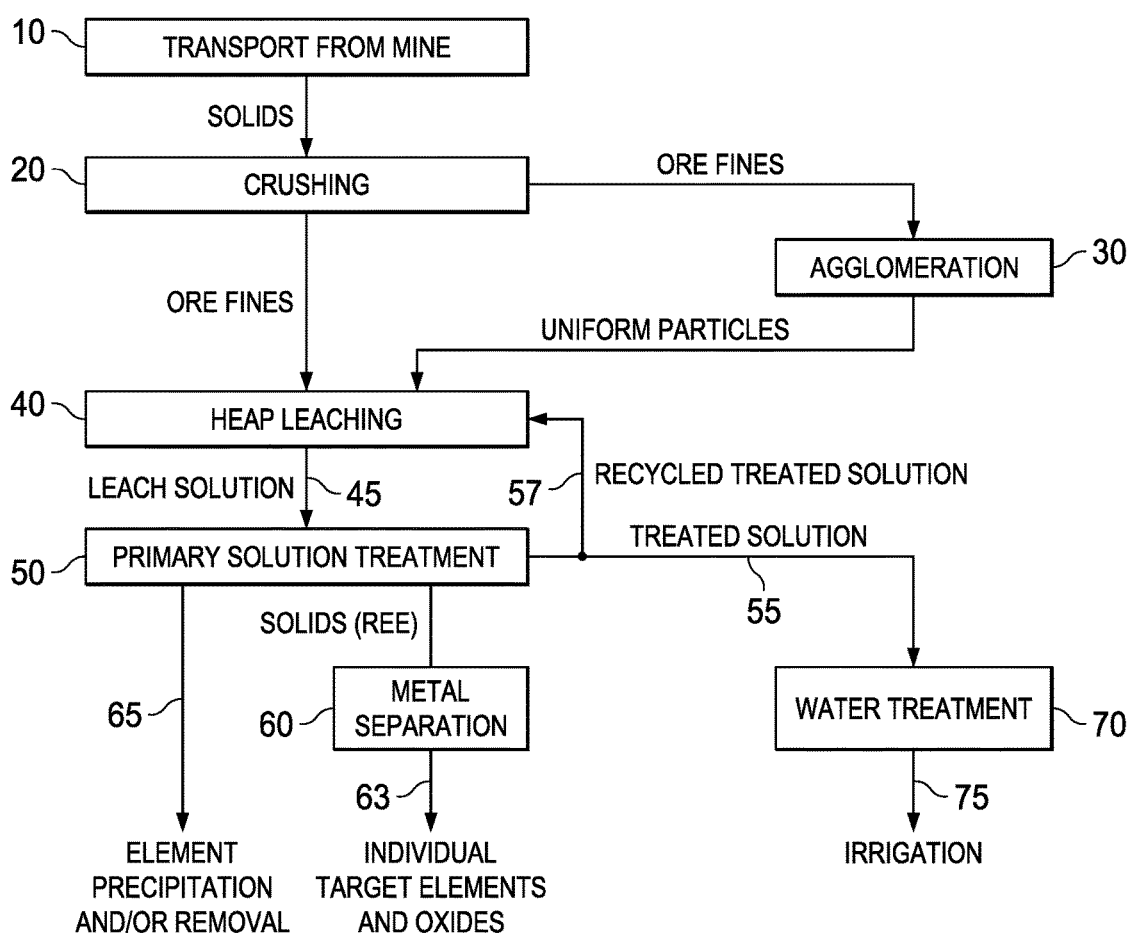
FIG. 1 depicts an exemplary process for extraction and recovery of rare earth elements (REEs) or rare earth oxides (REO's) by heap leach in accordance with some embodiments of this disclosure.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that can be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which can vary from one implementation to another. It will be appreciated that such a development effort, while possibly complex and time-consuming, would nevertheless be a routine undertaking for persons of ordinary skill in the art having the benefit of this disclosure.

In accordance with some embodiments, the present disclosure relates to processes for extraction and recovery of rare earth elements (REEs), including heavy rare earth elements (HREEs), using direct acid leaching and heap leaching. In accordance with other embodiments, the present disclosure also relates to a heap leaching process for dissolution of yttrium and light and heavy rare earth elements (Y+LREEs+HREEs) from a deposit in which the major Y+REE host mineral is "yttrium-bearing fluorite" referred to herein as yttrofluorite, the yttrium-bearing variety of fluorite.

Heap leaching is a process used in industrial mining operations. Groups of elements are extracted from ore by chemical processes that attack one or more minerals that contain the element(s) of interest. Once the groups of elements are separated from other earth materials, the group is further separated into individual target elements.

REEs comprise a set of seventeen chemical elements—yttrium (Y), scandium (Sc) and fifteen lanthanides—lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). REEs are found in the earth's crust and are generally plentiful. However, economic deposits of REE-bearing minerals are not common, and those minerals often are dispersed in such deposits. REEs are normally dispersed (i.e. not concentrated as rare earth minerals) in an ore deposit.

In a particular embodiment, yttrium and heavy rare earth elements (Y+HREE) deposits, (i.e., Y+HREEs: Y, Gd, Tb, Dy, Ho, Er, Tm, Yb, Lu) are found to have a unique mineralogy which allow for low-cost, efficient extraction and recovery via direct acid leaching and heap leaching.

While the remainder of the disclosure discusses processes that can be used to extract and recover REEs, or specifically Y+HREEs, from an ore deposit, such as an ore deposit found in Round Top Mountain, Tex., the disclosed processes can also be utilized with other ore deposits having similar characteristics found in other locations. The disclosed processes can also be used to remove light rare earth elements (LREEs, e.g., Scandium (Sc), Lanthanum (La), Cerium (Ce), Praseodymium (Pr), Neodymium (Nd), Samarium (Sm), Europium (Eu) and Gadolinium (Gd)).

One exemplary deposit found on Round Top Mountain in Hudspeth County, West Tex., USA (Round Top) has a surface-exposed rhyolite intrusion enriched in yttrium and heavy rare earth elements (HREEs), as well as Niobium (Nb), Tantalum (Ta), Beryllium (Be), Lithium (Li), Fluorine (F), Tin (Sn), Rubidium (Rb), Thorium (Th), and Uranium (U). The massive tonnage, estimated at well over 1 billion tons, of the deposit makes it a target for recovery of valuable yttrium and HREEs (Y+HREEs), and possibly other scarce elements. Because of the extremely fine grain size of the mineralized rhyolite matrix, it has not been clear which minerals host the Y+HREEs and in what proportions. REE bearing minerals and combinations reported in the deposit include bastnasite-cerium, yttrium bearing fluorite, xenotime-yttrium, zircon, aeschynite-cerium, a calcium-thorium-lead (Pb) fluoride, and possibly ancylite-lanthanum and cerianite-cerium. LREEs can also be present.

Extended X-ray Absorption Fine Structure (EXAFS) analysis indicates that virtually all of the yttrium of Round Top, a proxy for the HREEs, resides in a fluorite-type crystal structure, rather than those in the combination crystal structures of bastnasite-cerium and xenotime-yttrium. The amount of Y+REE in the Round Top deposit is just over 0.05%, with 72% of this consisting of Y+HREEs. This amount is in the range of the South China ionic clay deposits that supply essentially all of the world's Y+HREEs. Testing of the Round Top deposit indicates that 90-95% of the rock consists of unreactive and insoluble feldspars and quartz. In accordance with some embodiments, the combination of minerals described above can aid in the recovery of Y+HREEs using the processes disclosed herein, such as heap leaching with sulfuric acid or hydrochloric acid.

Fluorite is a common mineral. A part of calcium in fluorite can be replaced with rare earth elements to form a solid solution series, e.g., $(Ca_{1-x}REE_x)F_{2+x}$. The degree of substitution is usually slight; it rarely is greater than 0.3 Atoms per formula units (apfu). The yttrium or cerium bearing varieties of fluorite may also be known as "yttrofluorite," "yttrocerite" and/or "cerfluorite," but they are not independent mineral species. In November 2006, the Commission on New Minerals and Mineral Names of the International Mineralogical Association discredited yttrofluorite as an independent mineral species. The term is, however, encountered in pre-2006 literature, and remains in use as a mineral variety name, e.g., see the mindat.org website. The US Geological Survey's (USGS) 2002 compendium of hundreds of REE mines, deposits, and occurrences contains no reference to yttrofluorite or Y-bearing fluorite deposits. Only passing references to "yttrofluorite" or Y-bearing fluorite are found in such standard technical books as Rare Earth Minerals, The Mineralogical Society Series 7, London, Chapman and Hall, 1996, (12):311.

Y-bearing fluorite is a favorable economic rare earth element (REE) resource because of both its yttrium content and because it may also contain heavy rare earth elements (HREE). As described in more detail below, and in accordance with the processes of the present disclosure, yttrofluorite is dissolved in dilute mineral acid, such as sulfuric acid or hydrochloric acid, at room or ambient temperature in a heap leach process to extract the target elements, namely yttrium and HREEs, as well as light rare earth elements (LREEs). This simplifies the liberation of Y+LREEs+HREEs and permits use of a heap leach process for ore processing. As described in the experiments below, at Round Top, 90-95% of the rhyolite rock volume is feldspars and quartz, which are minerals that are unreactive to dilute sulfuric or hydrochloric acid. Thus, acid consumption is minimized. With the Y+HREEs present almost exclusively in Y-bearing fluorite, high to very high heap leach recoveries can be achieved from the processes disclosed herein.

Understanding the mineralogy of the Y+REEs and other elements is useful for developing an appropriate extraction protocol. Previous study of the elemental composition of mineral grains by electron microprobe indicates that the REEs are present in crystals of bastnasite-cerium, cerium bearing fluorite, yttrium bearing fluorite, xenotime-yttrium, zircon, aeschynite-cerium, a calcium-thorium-lead fluoride, and possibly ancylite-lanthanum and cerianite-cerium [Price 1990, Rubin 1987, Rubin 1989]. It is suspected, but not confirmed, that most of the REEs are hosted in various fluorine minerals. The relevant microprobe analyses were limited by grain size: only "large" particles, most 5-10 µm in dimension, could be examined. Aside from the feldspar and quartz phenocrysts, most of the remaining 5-10% of the rock volume comprises grains a micrometer or less in diameter. These are not suitable for electron probe microanalysis. The fraction of the REEs in each mineral, or in unidentified phases too small to analyze, was not, and probably cannot be estimated. Optical or microprobe point counting of grains is one technique to quantify the fraction of an element in different phases. However, this is not possible due to both the low concentration and minuscule grain size (analogous to "invisible" gold) of the elements in the bulk rock.

X-ray Absorption Fine Structure (XAFS), a technique of X-ray Absorption Spectroscopy (XAS), uses photons of a specific energy (narrowly tuned via a double-crystal monochromator to approximately 1 eV or less) to couple with a specific electron energy level within the element of interest and generate the emission of the corresponding photoelectron. The emitted photoelectron wave backscatters when it encounters near-neighbor atoms, with resultant positive or negative auto-interference, depending on the phase relation of the outgoing and backscattered wave. Negative interference lowers the overall photoelectron yield, which depends on the initial and final photoelectron energy states. The phase relation depends on the photoelectron wavelength and the distance(s) between the origin atom and the near-neighbor atom(s). By incremental increase of the photoelectron energy beyond the absorption edge, additional energy is transferred to the photoelectron, increasing its kinetic energy and therefore decreasing its wavelength. In this way, the atomic near neighborhood of the atom of interest is probed sequentially by photoelectrons of different wavelengths, each generating a different auto-interference and thus a different photoelectron yield, which is recorded via the yield of characteristic X-rays emitted as the atom returns to its ground state. Thus, a single experiment results in a spectrum of photoelectron yield versus X-ray beam photon energy. This pattern can be used as a fingerprint, analogous to an X-ray diffraction pattern, for a specific compound or state (e.g., adsorption) by comparison with known materials, or can, with sufficiently detailed data, be analyzed for such structural and electronic parameters as valence, number of neighbors, distances to them, and their elemental identities.

XAS and XAFS offer certain advantages over X-Ray Diffraction (XRD). First, because it excites a specific element, it can provide structural information at concentrations far lower than XRD, in the parts-per-million range rather than in the percent range. Second, effectiveness of XAS is not limited to repetitive (lattice) structures as is XRD, but can analyze absorbed atoms as well. An important advantage of XAS over electron microprobe analysis is that XAS in theory interrogates every atom of, say, yttrium in a bulk, 3-dimensional sample (to the escape depth of the emitted characteristic X-rays), not just those in single grains specifically targeted for analysis and residing at the surface of a sample.

In one embodiment, the minerals that host Y+HREEs and their proportions was investigated by synchrotron-based X-ray absorption spectroscopy (XAS) experiments. This provided the opportunity to directly speciate or determine the mode(s) of incorporation of a particular element in a bulk sample. For this initial study, yttrium was studied because it is an abundant Y+HREE (Table 1) in the Round Top deposit at 221 g/t (grams/ton or ppm) and provides an accessible K-edge for XAS. Yttrium is markedly similar in its chemical and geochemical behavior to the HREEs, e.g., holmium (Ho) and dysprosium (Dy). In 102 acid leach experiments (briefly described later), the correlation between % dysprosium extracted and % yttrium extracted was a remarkable 0.975, significant at better than the 99.9% confidence level. Thus, yttrium serves as a valid and robust proxy for the HREE suite at Round Top. Examination of the individual HREEs in the rhyolite proved difficult due to interferences with the X-ray emissions associated with the L-III edges of the HREEs from the K-edge excitations and emissions of the major elements and transition metals in the rhyolite. The excitation energies of the K-edges of the HREEs are beyond those normally available at synchrotron sources.

TABLE 1

| HREE and Y average concentrations in Round Top Mountain rhyolite | | | | | | | | | |
|---|---|---|---|---|---|---|---|---|---|
| Y + HREE | Eu | Gd | Tb | Dy | Ho | Er | Tm | Yb | Lu | Y |
| g/t (ppm) | 0.2 | 10.6 | 3.6 | 31.7 | 8.0 | 32.8 | 7.1 | 56.5 | 8.9 | 221 |

The rare earth minerals are evenly distributed throughout the rhyolite intrusion as finely disseminated grains. Scanning electron microscope (SEM) backscatter images show the grain sizes vary from <5 microns to >100 microns. SEM images show the rare earth minerals occur as interstitial fillings and coat earlier crystallized phases. These minerals are often associated with other accessory minerals that crystallized from other incompatible elements. The even distribution of the rare earth minerals and their occurrence as interstitial fillings and grain coatings suggest these minerals crystallized from a fluid that fractionated from the crystallizing rhyolite intrusion. Most of the REE minerals occur as varieties of fluorite, suggesting the REE were transported as fluorine complexes in the fractionated fluid.

As mentioned above, heap leaching is a process used in industrial mining operations. Copper, precious metals, uranium and other elements are extracted from ore by chemical processes that attack one or more minerals that contain the element(s) of interest. Once the groups of elements are separated from other earth materials, the group is further separated into individual target elements.

Turning now to FIG. 1, an exemplary process for extraction and recovery of rare earth elements (REEs) or rare earth oxides (REO's) by heap leaching in accordance with some embodiments is disclosed. After transporting the ore from a mine (10), the process begins by crushing the mined ore into small chunks (ore fines) (20). In some aspects, an agglomeration process (30) can also be used. In such a process, the crushed ore fines are placed in an agglomeration drum (e.g., a rotary drum agglomerator) and agglomerated into particles having a more uniform size and shape. Where an agglomerator is used, the leach solution can be pre-mixed with the ore fines to start the leach before the heap.

The crushed ore fines are heaped onto a clay lined leach pad or other appropriate impermeable plastic leach pad to start the heap leaching process (40). The crushed ore is then irrigated (e.g. by drip irrigation, sprinklers, etc.) with a leach solution to dissolve the target minerals. The leach solution spreads through the heap, leaching the group of target minerals. This process is known as the leach cycle. The time frame for the leach cycle is dependent upon the type of ore and can take several days, weeks, months or up to several years. Following the leach cycle, the leach solution (45), which includes the dissolved group of target elements, is collected. The leach solution (45) is then processed in blocks 50 and 60 to recover the individual target element(s) (63). In accordance with some embodiments, in block 60, a solvent extraction process can be used to separate, purify and concentrate the individual target elements. Other minerals or compounds can also be precipitated (65). In some embodiments, the treated solution (55) can be reused in irrigation (75) after appropriate adjustment of the reagent levels using water treatment (70). In other embodiments, the treated solution can be recycled (57) and returned to the heap leaching process (40). In accordance with some embodiments, the leach solution is a mineral acid solution, such as a sulfuric acid solution or a hydrochloric acid solution.

As described in more detail below, a dilute sulfuric acid solution is effective for the heap leach of Y+HREEs hosted chiefly in yttrofluorite. In one embodiment, the sulfuric acid solution is approximately 8.3% (V/V) sulfuric acid. In one embodiment, the sulfuric acid solution is greater than approximately 8.0% (V/V) sulfuric acid. In one embodiment, the sulfuric acid solution is between approximately 5% V/V sulfuric acid and 10% V/V sulfuric acid.

In accordance with some embodiments, a diluted hydrochloric acid solution is effective for the heap leach of Y+HREEs. In one embodiment, the hydrochloric acid solution is approximately 3.86% (V/V) hydrochloric acid. In another embodiment, the hydrochloric acid solution is approximately 7.72% (V/V) hydrochloric acid. In another embodiment, the hydrochloric acid solution is approximately 11.58% (V/V) hydrochloric acid. In another embodiment, the hydrochloric acid solution is greater than approximately 3.0% (V/V) hydrochloric acid. In one embodiment, the hydrochloric acid solution is between approximately 3.0% (V/V) hydrochloric acid and approximately 12.0% (V/V) hydrochloric acid.

As described in more detail below, certain grain sizes are effective for the heap leach of Y+HREEs. In one embodiment, the grain size is between approximately 2 mm and 4 mm. In one embodiment, the grain size is less than approximately 0.125 mm. In another embodiment, the grain size is between approximately 2 mm and 20 mm. In some embodiments, the grain size is approximately 12.5 mm. In other embodiments, the grain size is between approximately 2 mm and 10 mm. In some embodiments, the processing step comprises crushing the mined ore into a grain size of between approximately 2 mm and 4 mm.

As described in more detail below, certain temperatures are effective for the heap leach of Y+HREEs. In some embodiments, the leaching is performed at room temperature, e.g. approximately 19° C. In some embodiments, the leaching is performed at an elevated temperature, e.g. approximately 70° C. In some embodiments, a solar pond can be used to provide a higher temperature for the heap leach process.

As described in more detail below, certain leach times are effective for the heap leach of Y+HREEs. For example, the leach time can be days, weeks or months. In some embodiments, the leaching is performed for one day. In some embodiments, the leaching is performed for three days. In some embodiments, the leaching is performed for five days. In some embodiments, the leaching is performed for two weeks. In some embodiments, the leaching is performed for 11 weeks. In some embodiments, the leaching is performed for up to three months. In some embodiments, the leaching is performed for three or more months.

To assist in understanding the disclosed embodiments, the following experiments to illustrate various hydrometallurgical processes for extraction and recovery of REEs are described. The experiments described herein should not, of course, be construed as specifically limiting the disclosed embodiments and such variations of the embodiments, now known or later developed, which would be within the purview of one skilled in the art and considered to fall within the scope of the disclosed embodiments as described herein and claimed.

In Experiment 1, the amenability of heap leaching for extraction of REE's was evaluated. Leaching experiments demonstrate that the Y+HREEs are liberated by dissolution with dilute sulfuric acid, which is believed to be due to the solubility of yttrofluorite. Leaching with different acid strengths, grain sizes, and exposure times showed up to 90% recovery of the Y+HREEs. Similar recoveries are obtained from longer exposure times at lower sulfuric acid concentration. Grain size is in the 2 mm to 10 mm range.

Experiment 1A was performed using samples from Round Top. Static leach tests (bucket leach tests) evaluated the relative leachability with sulfuric acid of various size fractions of the material as well as with various acid strengths. Two open-circuit column tests were run at two different acid strengths to generate heap leaching design data.

The leaching test results of Experiment 1A include:

1. The sulfuric acid strength for the 63 day static bucket tests was 10 g/l. The best extractions occurred with a nominal ½ inch by 1 inch crush size. Yttrium, dysprosium, Y+HREE and Y+LREE+HREE extractions averaged from 42% to 49%. Yttrium and dysprosium extractions from the ½ inch by 1 inch crush size were 61.1% and 57.5%, respectively.

2. The second series of static bucket tests used a nominal ½ inch crush size, a more spherical shape, and tested various acid strengths from 5 g/l to 100 g/l. A summary of the test results is shown in Table 2-1. Higher acid strengths resulted in higher extractions for all metals in every case. The acid consumption was not linear with the acid strength. Extractions were higher than any recoveries in previous flotation work.

TABLE 2-1

Summary of Bucket Static Leach Tests

| Test No. | Acid Strength g/l | Extraction, % | | | | | Acid Consumption Kg/mt |
|---|---|---|---|---|---|---|---|
| | | Y | Dy | U | Y + LREE + HREE | Y + HREE | |
| SL-10 | 5 | 24.6 | 21.4 | 4.8 | 24.8 | 27.3 | 9.2 |
| SL-6 | 10 | 47.4 | 42.8 | 13.3 | 43.3 | 47.5 | 13.1 |
| SL-7 | 30 | 70.5 | 64.9 | 21.2 | 62.2 | 68.4 | 19.4 |
| SL-8 | 50 | 77.4 | 74.8 | 28.4 | 67.4 | 74.1 | 21.6 |
| SL-9 | 100 | 84.0 | 79.4 | 30.7 | 73.4 | 79.9 | 29.6 |

3. Two open-circuit columns were run to generate data for preliminary heap leach design and to compare two different acid strengths. Column 1 had low acid strength of 35 g/l and Column 2 had high acid strength of 75 g/l. A summary of the data from the columns is shown in Table 2-2. The extractions were higher for the 75 g/l acid strength, being 82.8% and 79.9% for HREE+Y and TREE+Y, respectively at 60 days. Yttrium and dysprosium extractions were 91.3% and 87.2%, respectively for the 75 g/l acid strength at 60 days. Acid consumptions at 60 days were 22.3 and 26.2 kg/mt for the 35 g/l and 75 g/l cases, respectively. Kinetics were relatively fast in each case.

TABLE 2-2

Summary of Percent Extractions for Selected Elements

| | Column 1, Days (Low Acid) | | | Column 2, Days (High Acid) | | |
|---|---|---|---|---|---|---|
| Element | 20 | 40 | 60 | 20 | 40 | 60 |
| HREE + Y | 63.0 | 69.6 | 73.2 | 78.7 | 81.3 | 82.8 |
| TREE + Y | 62.5 | 68.8 | 72.4 | 74.5 | 78.0 | 79.9 |
| Y | 79.0 | 87.4 | 89.6 | 86.0 | 90.0 | 91.3 |
| Dy | 74.4 | 81.2 | 83.3 | 83.0 | 86.2 | 87.2 |
| U | 21.6 | 24.9 | 26.2 | 26.4 | 29.6 | 31.0 |
| Th | 81.4 | 86.9 | 89.2 | 85.5 | 89.1 | 90.8 |
| Lu | 56.5 | 62.9 | 65.0 | 61.6 | 65.6 | 67.0 |
| Ho | 73.6 | 80.2 | 82.2 | 82.6 | 85.5 | 86.4 |
| Er | 69.9 | 76.4 | 78.6 | 79.2 | 82.2 | 83.3 |
| Tm | 62.7 | 69.0 | 71.1 | 73.7 | 76.7 | 77.7 |
| Yb | 59.8 | 65.9 | 68.0 | 69.7 | 73.2 | 74.4 |
| Tb | 76.6 | 83.1 | 85.3 | 82.7 | 85.9 | 87.0 |
| Be | 2.3 | 4.3 | 5.6 | 4.9 | 8.0 | 9.7 |
| Li | 10.1 | 22.0 | 30.3 | 26.8 | 45.4 | 58.5 |

Experiment 1B was performed using samples from Round Top. Basic information was gathered regarding removal of iron, aluminum, uranium and thorium from pregnant leach solution followed by selective removal of REE's. This embodiment included pH adjustments to drop out iron followed by contact with Column 1 media which is designed specifically for uranium and thorium removal. The remaining solution was contacted with Column 2 media which is specific for removal of REE's.

The highlights of the test results are summarized below:
1. The uranium and thorium could be partially removed with little or no REE removal in the first stage contact.
2. In the second stage contact, much of the uranium and thorium not removed in the first stage was recovered. The REE removal is low.

Experiment 1C was performed with samples from Round Top and is further described in "Round Top Mountain rhyolite (Texas, USA), a massive, unique Y-bearing-fluorite-hosted heavy rare earth element (HREE) deposit," *Journal of Rare Earths*, Volume 32, Issue 1, January 2014, pages 90-96 which is incorporated by reference herein. All but one sample were splits from a well-mixed >250 kg sample composited from material recovered from a representative set of reverse circulation exploration drill holes into the Round Top Mountain rhyolite. This material assayed at 211 g/t yttrium. Table 3 lists two samples that were sieved to the specified grain size, and a third sample that was a small block cut from a large grain recovered from the drill debris. The remaining five samples were size-sorted granular rhyolite that was leached for various periods and temperatures in 8.3% (V/V) sulfuric acid. The amount of the initial yttrium remaining in the samples, relative to the respective untreated material (first two samples), is listed. All samples, except for the block, were subsequently reduced in a ball mill to <10 μm grain size, and pressed into a standard 25-mm X-ray fluorescence puck with the addition of a cellulose binder and paraffin sealant. The percent yttrium remaining in the leached solids was determined by X-ray Absorption Spectroscopy (XAS) of the respective untreated and treated samples, using a PANalytical Epsilon5 energy dispersive spectrometer with a germanium solid-state detector.

TABLE 3

Samples analyzed by XAS

| Sample ID | Grain Size 1 | Leach time | % Y remaining | Temperature |
|---|---|---|---|---|
| YBLK2TO4 | 2-4 mm | N/A | 100 | N/A |
| YBLK0TO125 | <0.125 mm | N/A | 100 | N/A |
| ROCK1 | polished block | N/A | 100 | N/A |
| YHOT8 | 2-4 mm | 3 days | 40 | 70° C. |
| YS405D | 2-4 mm | 5 days | 38 | Room ~19° C. |
| YS408322W | 2-4 mm | 2 weeks | 26 | Room ~19° C. |
| YS4083211W | 2-4 mm | 11 weeks | 23 | Room ~19° C. |
| YS01258323D | <0.125 mm | 3 days | 21 | Room ~19° C. |

Experiment 2 were XAS experiments performed at the Stanford Synchrotron Radiation Lightsource (SSRL), a part of the Stanford Linear Accelerator (SLAC) located in Menlo Park, Calif., USA. Data were collected in fluorescence mode on beamline 7-3, using a 30-element germanium detector, and on beamline 9-3 with a 100-element monolith germanium detector. The synchrotron was operated in continuous fill mode, with a current ranging from 500 to 495 mA (on 7-3), and at 100 mA with discrete fill (on 9-3). When appropriate, the beam was detuned 30%. Spectra for yttrium were collected at the K-edge, using Soller slits and a Sr-3 filter to attenuate beam scatter. Data were collected using XAS-Collect software and processed with SIXPack and EXAFSPAK.

A total of six specimens of four relevant REE model compounds (i.e., known to be present at Round Top) were obtained commercially to compare with the rhyolite samples. These are listed in Table 4.

TABLE 4

Model REE compounds for spectral comparison with samples

| Mineral | Elemental Formula | Y % | Collection Locality |
|---|---|---|---|
| Y-bearing fluorite | $(Ca_{1-x} Y, HREE_x)F_{2+x}$ | 1.7 | Joseph Mine, Ojo Caliente District, Rio Arriba County, New Mexico, USA |
| Y-bearing fluorite | $(Ca_{1-x} Y, HREE_x)F_{2+x}$ | 15.5 | Innhavet, Drag, Nordland, Norway |
| Bastnäsite-(Ce) | $CeCO_3F$ | 0.02 | Zagi Mine, Pakistan |
| Bastnäsite-(Ce) | $CeCO_3F$ | 0.36 | Unknown, Pakistan |
| Xenotime-(Y) | $(Y, HREE)PO_4$ | 37.0 | Bahia, Brazil |
| Fluocerite-(Ce) | $(Ce, La)F_3$ | 1.1 | Unknown, Brazil |

Figure 2A:
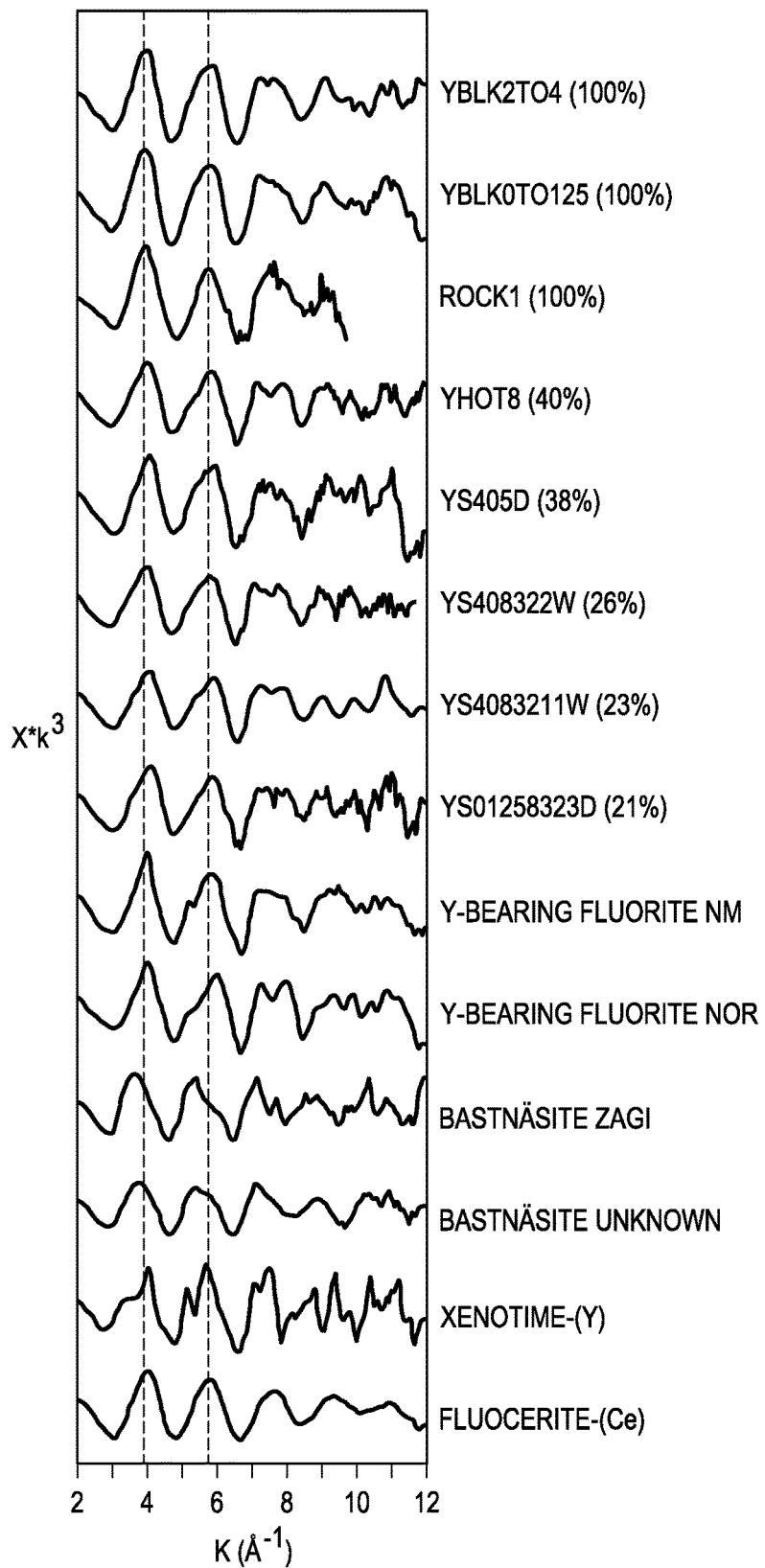
FIG. 2a depicts extended X-ray absorption fine structure (EXAFS) spectra and FIG. 2b depicts the Fourier transform of the EXAFS spectra for target samples and model compounds from an exemplary ore deposit.
Figure 2B:
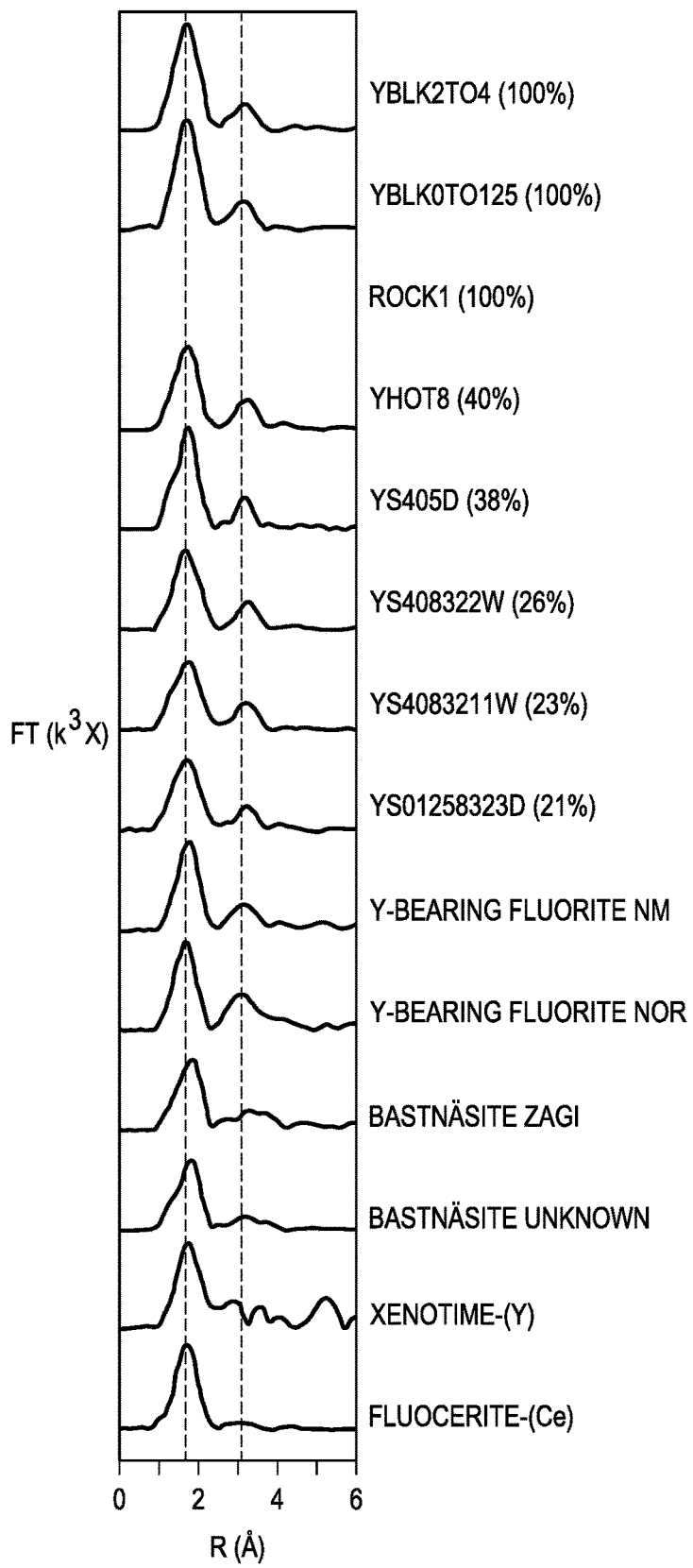

Turning now to FIG. 2, FIG. 2a depicts Extended X-ray Absorption Fine Structure (EXAFS) spectra and FIG. 2b depicts the Fourier transform of the EXAFS spectra for eight target samples of Table 3 and model compounds of Table 4 from an exemplary ore deposit. In FIG. 2a, the EXAFS spectra is background-subtracted, normalized, $k^3$-weighted, and plotted in k-space. FIG. 2b depicts plots of the radial distribution functions (RDF) derived from Fourier transforms (FT) of the EXAFS spectra in FIG. 2a. In FIG. 2b, distances are not corrected for phase shift and no FT is given for ROCK1 due to shorter k-space 3.5-cycle spectrum. For samples YS4083211W and Y-bearing fluorite NOR, the EXAFS spectra is smoothed to remove excess signal noise.

To assist in matching samples to model compounds, FIG. 2a shows the entire EXAFS region as a single "fingerprint" with multiple ridges and valleys. In both panels, a strong pattern similarity is observed among all the Round Top samples. Some differences are the result of data quality, i.e., one or more close minor peaks being clumped into a single peak or a humped peak due to lower resolution. Likewise, different specimens of each of the model compounds are consistent within that model. All of the samples closely resemble the spectra of the Y-bearing fluorite NM and Y-bearing fluorite NOR model compounds. There appears to be no resemblance to xenotime-yttrium, and little to bastnasite-cerium Zagi and bastnasite-cerium Unknown. Thus, it appears that most if not almost all of the yttrium in these samples, which are representative of the deposit, likely resides in the fluorite-type crystal structure among the four phases examined in the present study.

The samples were leached in the laboratory in sulfuric acid, a process that removed much of the yttrium from the grains. Xenotime-yttrium is insoluble in sulfuric acid, and bastnasite-cerium sparingly soluble or probably insoluble in dilute sulfuric acid. If any of the original yttrium resided in either of these two phases or other insoluble minerals, the little yttrium remaining post-leaching would mostly be in those minerals and yield their respective spectra. This did not occur; the samples with decreasing percentages of remaining yttrium in FIG. 2 still retain only the Y-bearing fluorite spectral signature. This indicates that perhaps five percent or less of the yttrium is not in the lattice of fluorite, i.e., 95% or more of the yttrium and by analogy the HREEs are hosted in the Y-bearing fluorite. Therefore, the Round Top mineralogy is extremely favorable for extraction of the Y+HREEs by heap leaching. Minor differences between the spectra of the two Y-bearing fluorite model compounds can reasonably be attributed to the substitutional nature of this mineral. Therefore, there is no specific set of elements in the near-neighbor cation shells surrounding the yttrium atoms. Given this fact, the nearly, but not perfectly, identical spectra of the two Y-bearing fluorites from separate localities is not surprising. Further, minor differences in the sample spectra can be attributed to slightly different materials in the different splits.

The EXAFS spectra of the eight samples were entered into the Principal Components Analysis (PCA) program in the SIXPack data analysis package. They yielded a single principal component, confirming mathematically that the sample set is monomineralic. Target transformations to each of the six model compounds indicated that the Y-bearing fluorite from New Mexico was the best match to the samples. Thus, the samples are most likely Y-bearing fluorite.

Figure 3:
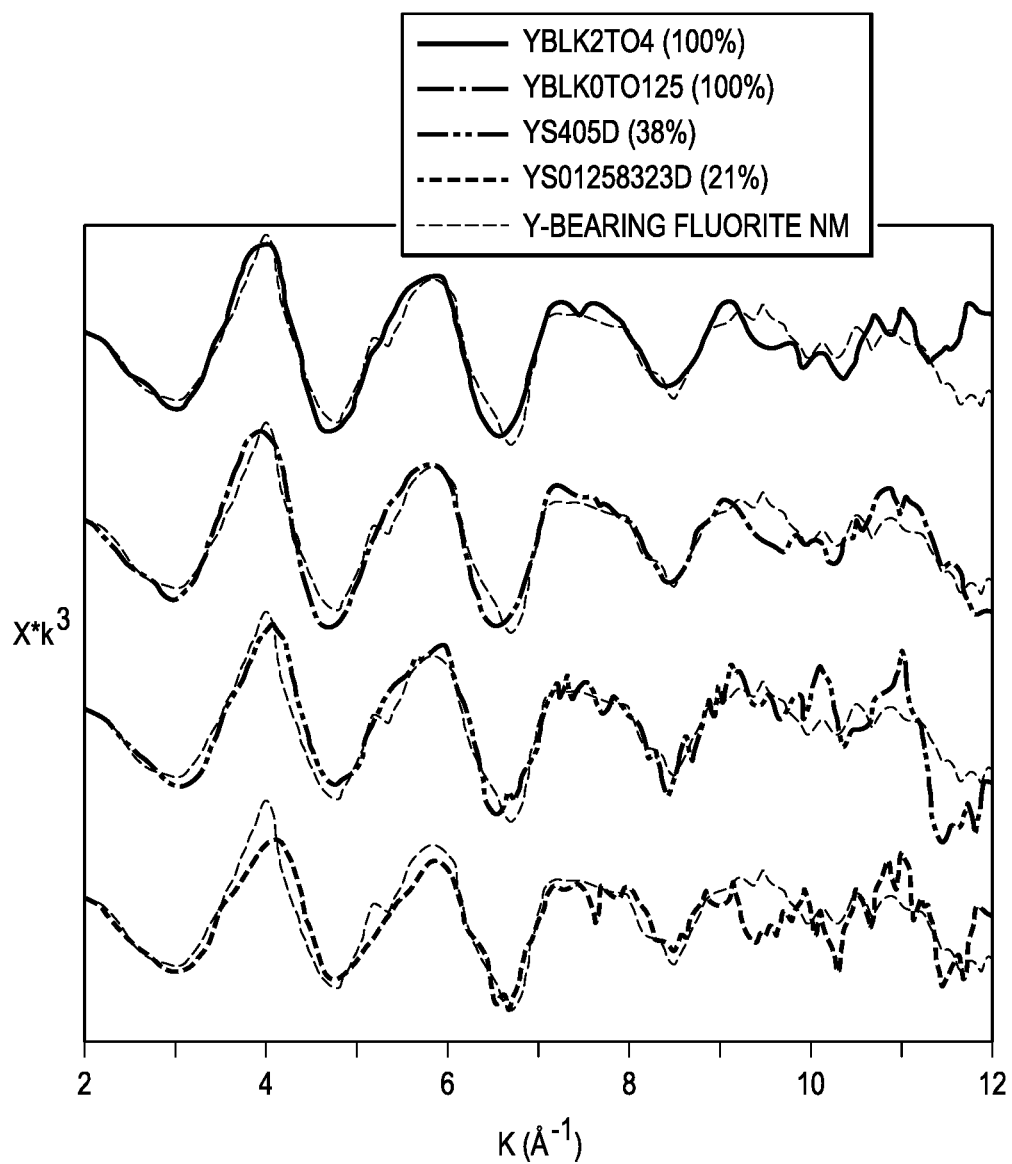
FIG. 3 depicts a least squares spectral fit of a model compound relative to unleached target samples and leached target samples in accordance with some embodiments of the present disclosure.

FIG. 3 presents the Least-Squares Spectral fits of the Y-bearing fluorite from New Mexico to two unleached samples YBLK2TO4 (100%) and YBLK0TO125 (100%) and to two leached samples, YS405D (38%) and YS01258323D (21%). In the two leached samples, only 38% and 21% of the original yttrium remains. The fit is seen to be nearly identical in all cases. The differences are comparable to the variation seen between the two different Y-bearing fluorite model compounds themselves. Note that data quality suffers in the leached samples due to their considerably smaller yttrium content. This appears to reinforce our speculation that Y-bearing fluorite is the only host mineral for yttrium in Round Top rhyolite.

X-ray Absorption Spectroscopy of Experiment 2 suggests that virtually all the yttrium, and therefore by proxy the HREEs, in the Round Top Mountain rhyolite deposit is hosted in Y-bearing fluorite. The deposit is thus unique. The yttrium, and by analogy, the HREEs, are hosted in Y-bearing fluorite, thus heap leach recoveries by dilute sulfuric acid in accordance with the processes disclosed herein are achieved.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms can reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments can include processes that use fewer than all of the disclosed operations, processes that use additional operations, and processes in which the individual operations disclosed herein are combined, subdivided, rearranged, or otherwise altered.

This disclosure may include descriptions of various benefits and advantages that can be provided by various embodiments. One, some, all, or different benefits or advantages can be provided by different embodiments.

In view of the wide variety of useful permutations that can be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for recovering yttrium and light and heavy rare earth elements by a heap leaching process, the method comprising:
   processing ore containing deposits of yttrium and light rare earth elements (Y+LREEs) and deposits of yttrium and heavy rare earth elements (Y+HREEs), wherein the ore contains yttrofluorite;
   irrigating the ore on a leach pad with a mineral acid leach solution;
   dissolving the yttrofluorite in the ore in the mineral acid leach solution; and
   treating the yttrium and heavy rare earth elements in the mineral acid leach solution to recover the yttrium and heavy rare earth elements from the ore.

2. The method of claim 1, further comprising treating the light rare earth elements in the mineral acid leach solution to recover the light rare earth elements from the ore.

3. The method of claim 1, wherein the processing step comprises crushing the ore into a grain size of approximately 2 mm to approximately 20 mm.

4. The method of claim 1, wherein the processing step comprises crushing the ore into a grain size of approximately 12.5 mm.

5. The method of claim 1, wherein the mineral acid leach solution comprises hydrochloric acid.

6. The method of claim 1, wherein the mineral acid leach solution comprises sulfuric acid.

7. The method of claim 6, wherein the mineral acid leach solution comprises from approximately 5.0% V/V sulfuric acid to approximately 10.0% V/V sulfuric acid.

8. The method of claim 6, wherein the mineral acid leach solution comprises 8.3% V/V sulfuric acid.

9. The method of claim 1, wherein the irrigating step is conducted for up to approximately three months.

10. The method of claim 1, wherein the irrigating step is conducted at ambient temperature.

11. A method for heap leaching yttrium and light and heavy rare earth elements, the method comprising:
    crushing ore from a rock formation containing yttrofluorite or other acid soluble yttrium and rare earth element (Y+REE) containing minerals, wherein the ore contains a deposit of light rare earth elements (LREEs) and a deposit of heavy rare earth elements (HREEs), wherein yttrofluorite hosts at least some of the yttrium and heavy rare earth elements (Y+HREEs);
    heaping the ore on a leach pad;
    allowing a mineral acid leach solution to permeate the ore to dissolve the yttrofluorite in the rock formation; and
    separating the yttrium and heavy rare earth elements in the mineral acid leach solution to recover the yttrium and heavy rare earth elements from the ore.

12. The method of claim 11, further comprising separating the light rare earth elements in the mineral acid leach solution to recover the light rare earth elements from the ore.

13. The method of claim 11, wherein the crushing step comprises crushing the ore into a grain size of approximately 2 mm to 20 mm.

14. The method of claim 11, wherein the crushing step comprises crushing the ore into a grain size of approximately 12.5 mm.

15. The method of claim 11, wherein the mineral acid leach solution comprises hydrochloric acid.

16. The method of claim 11, wherein the mineral acid leach solution comprises sulfuric acid.

17. The method of claim 16, wherein the mineral acid leach solution comprises from approximately 5.0% V/V sulfuric acid to approximately 10.0% V/V sulfuric acid.

18. The method of claim 16, wherein the mineral acid leach solution comprises 8.3% V/V sulfuric acid.

19. The method of claim 11, wherein the allowing step is conducted for up to approximately three months.

20. The method of claim 11, wherein the mineral acid leach solution permeates the ore at approximately room temperature.

* * * * *